Dec. 13, 1960  J. H. BARNES  2,964,357
TRIM MEMBER FOR PNEUMATIC TIRES AND
ATTACHMENT MEANS THEREFOR

Filed Sept. 25, 1956  3 Sheets-Sheet 1

INVENTOR.
JAMES H. BARNES
BY Oldham & Oldham
ATTYS.

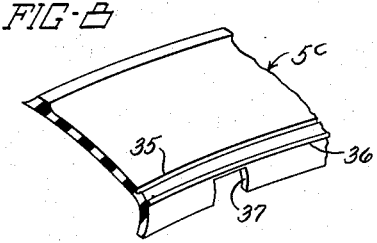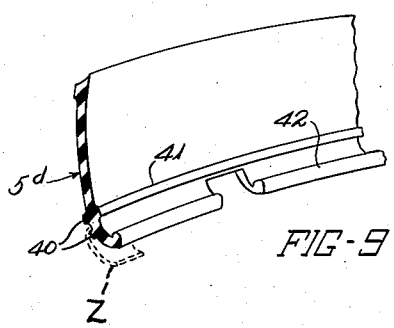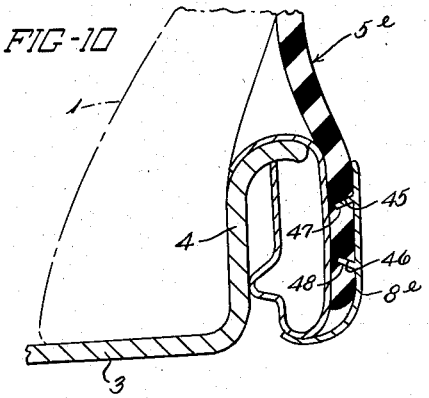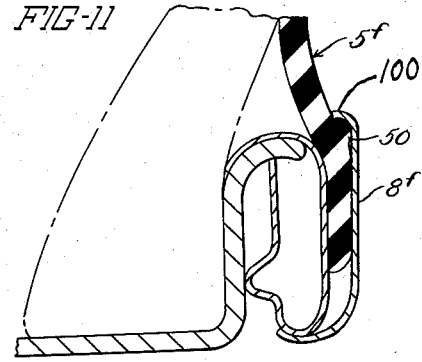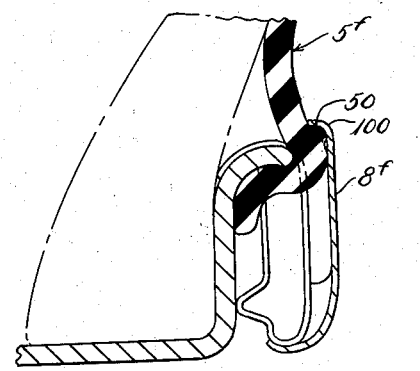

Dec. 13, 1960 J. H. BARNES 2,964,357
TRIM MEMBER FOR PNEUMATIC TIRES AND
ATTACHMENT MEANS THEREFOR
Filed Sept. 25, 1956 3 Sheets-Sheet 3
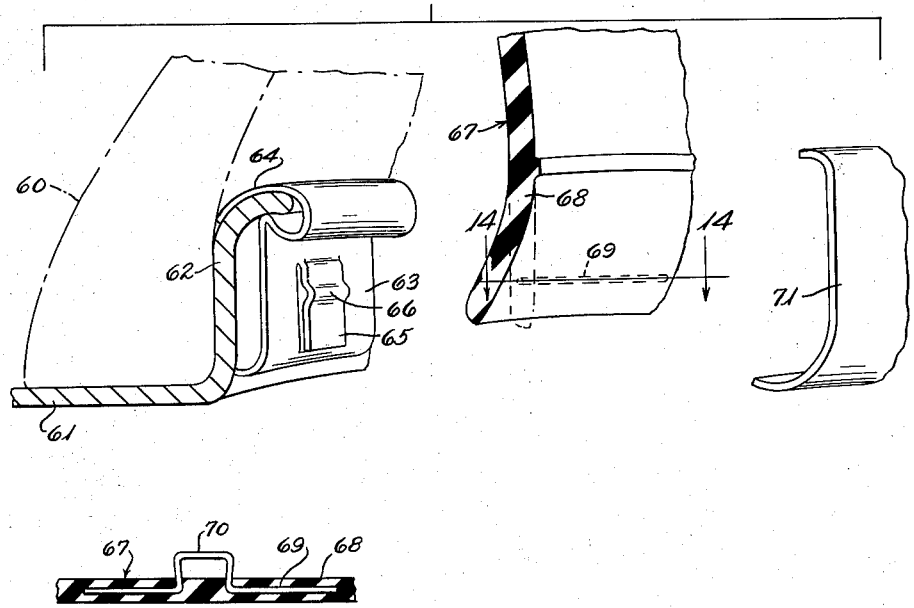
FIG-13
FIG-14
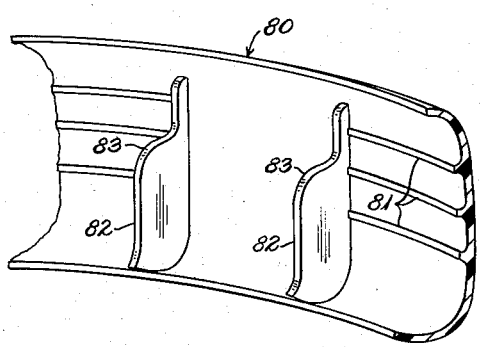
FIG-15
INVENTOR.
JAMES H. BARNES
BY Oldham & Oldham
ATTYS.

2,964,357

TRIM MEMBER FOR PNEUMATIC TIRES AND ATTACHMENT MEANS THEREFOR

James H. Barnes, Wadsworth, Ohio, assignor to Edward L. Wood, Detroit, and Charles B. Aske, Jr., Birmingham, Mich.

Filed Sept. 25, 1956, Ser. No. 611,945

15 Claims. (Cl. 301—37)

This invention relates to trim members for pneumatic tires and particularly to trim members and attachment means therefor for use with pneumatic tire and wheel assemblies.

New cars as commercially made and sold today embody the use of many brightly hued colors therein. This particularly applies to the outside finish of the vehicles, and is also present in the car interiors. To add to the vehicles' appearance, many people purchase white sidewall tires for use with their vehicles, but such tires are hard to manufacture, are relatively expensive and usually cannot be transferred from car to car, if a purchaser changes vehicles that he owns.

I previously have secured Patent No. 2,737,422 upon one type of a removable sidewall trim and decorative member for use in pneumatic tire and wheel assembly, and these articles have been made and sold commercially in large quantities.

It is a general object of the present invention to provide a novel and improved type of a trim and decorative member for use with pneumatic tire and rim assemblies and where the attachment or trim member can be secured to a pneumatic tire and wheel assembly with a minimum of attachment labor and difficulty.

Another object of the invention is to provide a removable trim member for a pneumatic tire and wheel assembly wherein the trim member is constructed with special holding means therein to aid in engaging the trim member at least temporarily with anchor clips used for securing the trim member to a tire rim.

Another object of the invention is to use inter-engaging rib and locking recesses on a trim member and an anchor ring in the combination described to aid in holding an anchor ring in engagement with a trim member when operatively positioned.

Yet another object of the invention is to provide a novel design for a resilient trim member for use with pneumatic tires wherein such member is particularly adapted to engage with a tire rim flange and is adapted to seat snugly over and adjacent anchor clips used for securing the attachment means to the rim.

Yet other objects of the invention are to provide trim members of the class described with one or more ribs on the axially inner surface thereof for facilitating the seating of the trim member on a tire rim edge flange; and to provide a pair of concentric but spaced ribs on the axially outer surface of a trim member adjacent the connection of the trim member decorative portions and skirt portions and to have the radially outer edge of the C-shaped anchor ring engage therewith to facilitate securing the members in operative association with each other; to provide an anchor ring in a combination as described herein wherein the anchor ring has radially extending baffles or reenforcing walls therein to seat adjacent anchor clips used in the combination and reenforce the anchor ring which could be made from a resilient plastic or similar material; to provide interengaging locking means of various types on anchor clips and resilient trim members to facilitate securing the trim member operatively to an anchor clip; to provide a plurality of circumferentially spaced, generally radially extending channel means integrally molded into a trim member in the skirt portion thereof for engaging or bridging over anchor clips used in the combination of the class described; and to provide a pair of concentric converging annular rib and recess means on an anchor ring and trim member to facilitate engagement therebetween.

The foregoing and other objects and advantages of the invention will be made more apparent as the specification proceeds.

The novel trim member of the invention in general is of the same type disclosed in my above-identified U.S. patent and with such trim member being secured to a tire and wheel assembly by means of a plurality of positioning clips that can be forced into engagement with the rim edge flange and which will have the skirt portion of the trim member associated therewith when operatively positioned. An anchor ring, usually of generally C-shape in section, is used to engage the radially inner ends of the positioning clips and be bonded thereto to press against the skirt portion of the trim member and hold it in operative association with a tire and wheel assembly.

Reference now should be had to the accompanying drawings which illustrate certain currently preferred embodiments of the invention, and wherein:

Figs. 8 and 9 are fragmentary perspective views of yet further modifications of the trim member of the invention and with an anchor ring section being shown in Fig. 9;

Fig. 10 is a fragmentary vertical section, like Fig. 2, of a further modification of the trim and protective member assembly of the invention;

Fig. 11 is a vertical section of another modification of the trim member assembly of the invention taken at the anchor clip portion thereof;

Fig. 12 is a section, similar to Fig. 11, of the structure shown therein but taken at a point spaced from an anchor clip of the invention;

Fig. 13 is a fragmentary section partially in perspective of a tire and rim assembly having an anchor clip secured thereto and with novel trim and anchor ring means of the invention shown in exploded relation thereto;

Fig. 14 is a horizontal section taken on line 14—14 of Fig. 13; and

Fig. 15 is a fragmentary perspective view, from the axially inner surface, of a modified type of an anchor ring of the invention.

When referring to corresponding parts shown in the drawings and referred to in the specification, corresponding numerals are used to facilitate comparison therebetween.

Figure 1:
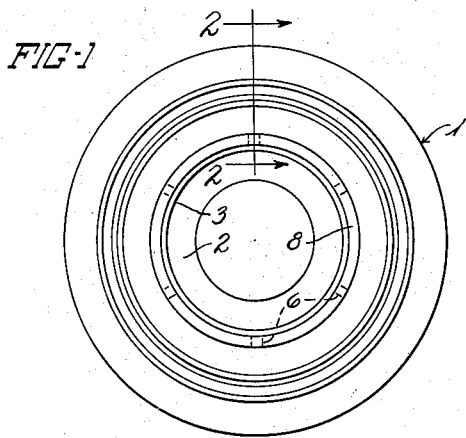
Fig. 1 is an elevation of a pneumatic tire and wheel assembly of the invention having a trim and protective member operatively secured thereto.

This invention in general relates to the same type of a tire trim member and securing means as disclosed in my prior application, Serial No. 586,558, filed May 22, 1956, now Patent No. 2,915,335, December 1, 1959. Various types of positioning clips, and/or anchor rings as disclosed in said application can be used in practice of the present invention.

It should be understood that while the present invention particularly shows wheel and rim members of integral construction, the word "rim" is used broadly in the present application and covers any type of a tire positioning rim, whether it is formed integrally with a wheel or whether it is made separately therefrom.

The present invention, generally speaking, relates to trim and protective apparatus for use with a pneumatic tire and rim assembly and comprising a plurality of clips having overhanging top flanges adapted for engaging a tire rim flange to extend radially inwardly on the outer surfaces thereof, which clips have radially inwardly open securing flaps provided thereon, a resilient flexible trim member having a decorative portion for lying against a tire sidewall and a radially inner skirt portion for contacting the clips when positioned on a tire rim, and the combination is completed by anchor wires or similar means anchored to or embedded in the skirt portion of the trim members and having sections extending from the axially inner surfaces thereof to engage the securing flaps on the clips when operatively positioned for securing a trim member to a tire rim. The invention also covers novel details of the construction of the protective and trim member of the invention and special types of anchoring rings used for securing the trim members to clips or similar members when operatively positioned in association with a tire and wheel assembly.

Attention now is particularly directed to the details of the construction shown in the accompanying drawings and reference should be had thereto to understand the present invention completely. These drawings illustrate a conventional pneumatic tire 1 which is carried on a standard metal wheel 2. This wheel 2 is shown with an integral rim 3 provided thereon and a rim edge flange 4 is provided for positioning the bead portion of the tire 1 operatively on this rim 3.

The invention relates to the positioning of a resilient trim and decorative member 5 on the tire and wheel combination by means of a plurality of positioning or anchor clips 6 which engage with the top edge flange, or edge of the edge flange 4 and with a radially inner skirt portion 7 of the trim and decorative member 5 being operatively positioned over such clips 6 and being secured thereto by means of an annular anchor ring 8 which is of elongated or flattened C-shape in section. A decorative portion 9, which is flatly arcuately curved in section, is provided in the radially outer portion of the trim and decorative member 5 and by use of the means disclosed, the skirt portion 7 of this member so positions the decorative portion 9 that it resiliently engages or hugs the adjacent sidewall portion of the tire 2. The trim and decorative member 5 extends up from the anchor ring 8 for engaging and protecting such adjacent portion of the tire sidewall.

Figure 4:
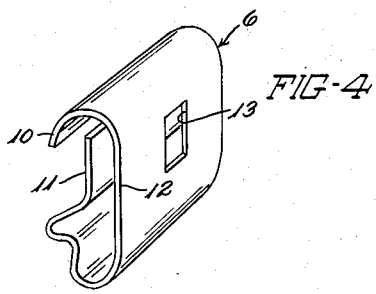
Fig. 4 is a perspective view of an anchor clip as used in Fig. 2.

Fig. 4 of the drawings best shows the details of the anchor clips 6 and these clips are shown as being provided with overhanging top flanges 10 and with an inner wall 11 and an outer wall 12. This outer wall 12 has a slot or aperture 13 therein for receiving a lug or boss 14 provided on the axially inner surface of the skirt portion 7 of the resilient trim and decorative member to facilitate the temporary engagement of the trim and decorative member 5 with such anchor clips 6 when assembling the trim and decorative member 5 onto the tire and wheel assembly and prior to engagement of the anchor ring 8 therewith. In general, these anchor clips 6 can be of any desired constructions such as are disclosed herein or in my above-identified patent application, as long as, in this modification of the invention, the clips have the slot 13 or equivalent structure provided therein.

Figure 2:
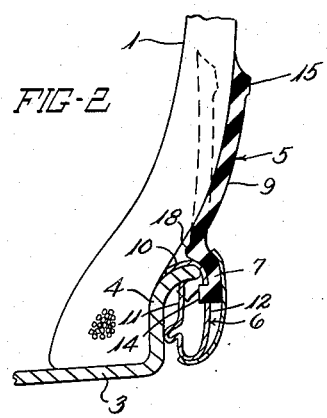
Fig. 2 is a fragmentary enlarged vertical section taken on line 2—2 of Fig. 1.
Figure 3:
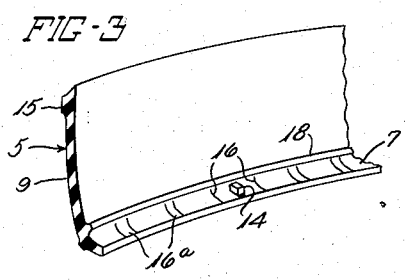
Fig. 3 is a fragmentary perspective view from the axially inner surface of the trim and protective member of Figs. 1 and 2.

Fig. 3 of the drawings best shows that the trim and decorative member is of substantially uniform thickness throughout the skirt and decorative portions thereof except for a reenforcing bead or edge rib 15 provided thereon. It also should be noted that this skirt portion extends substantially at right angles from the decorative portion 9 and with the skirt portion being quite short and being shaped to engage snugly under the radially inner edge of the tire rim edge flange 4, as indicated in Fig. 2. The skirt portion 7 is provided with at least a pair of axially extending slits or cuts 16 therein which are positioned immediately adjacent each of the lugs 14 so that section of the skirt can extend out over a clip 6 and leave the remainder of the skirt portion tightly against the edge of the rim flange. These lugs 14 are provided at a plurality of circumferentially spaced positions equally distributed around the periphery of the skirt portion 7 for engagement with the clips 6 which likewise must be equally spaced circumferentially around the rim 3. If desired, a plurality of other slits or cuts 16a can be provided in the skirt portion 7 to permit any individual sections of the skirt portion 7 to bridge over any wheel weights or other obstructions provided upon the axially outer surface of the rim edge flange 4.

It will be realized that the trim and decorative members of the invention are originally molded or shape to a contour other than that in which the trim and decorative members take when operatively positioned. Fig. 2 indicates that the decorative portion 9 of the trim and decorative member 5 will initially be molded or shaped to extend or take a position axially inwardly of the tire 1 with relation to that into which the member is forced by engaging a tire sidewall. This aids in providing the resilient, hugging action in the trim member and provides desirable operating characteristics therefor.

Yet another important feature provided on the trim and decorative member 5 of the invention is that of a rib 18 that is provided on the axially inner surface of the trim and decorative member adjacent the connection of the decorative portion 9 to the skirt portion 7 thereof. Such rib 18 is of sufficient size and is usually of a generally rounded contour to provide a seating action against the radially outer portion of the tire rim flange 4 when the trim and decorative member is operatively engaged therewith. Fig. 2 of the drawings best shows that the anchor ring 8 makes a reverse curvature section in the trim and decorative member where the skirt and decorative portions of the member engage. Such rib or bead 18 also reenforces the trim and decorative member at this part thereof wherein a reverse curvature may be formed therein and this strengthens the trim and decorative member to avoid any cutting action thereon by the anchor ring 8 in operation.

Figure 5:
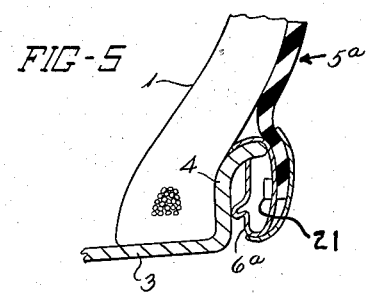
Fig. 5 is a fragmentary vertical section, like Fig. 2, of a modification assembly of the invention.
Figure 6:
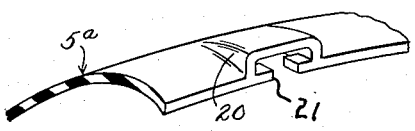
Fig. 6 is a fragmentary perspective view of the type of a trim member shown in Fig. 5, shown from the axially outer surface thereof.

Figs. 5 and 6 show a modified type of a trim and decorative member 5a of the invention and wherein a plurality of circumferentially spaced channels or ribs 20 are initially molded or formed in the skirt portion of this trim member. Each of these channels 20 is on the axially outer portion of the skirt of the trim and decorative member, and are so spaced and formed as to bridge or fit snugly over and around the sides of individual clips 6a as positioned around the periphery of a rim edge flange. Inwardly extending lips 21 are provided on the channels 20 shown in Fig. 6 to aid in engaging the trim member 5a with the clip means used in anchoring the trim member to a tire and wheel assembly.

Figure 7:
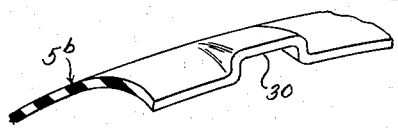
Fig. 7 is a fragmentary perspective view of a further modification of the trim member of the invention, which view is similar to Fig. 6.

Fig. 7 shows yet another modified type of a trim and decorative member 5b of the invention. As a novel portion of this trim member, a plurality of circumferentially spaced, radially directed channels 30 are provided molded integrally in the trim and decorative member and protruding axially outwardly therefrom. Such channels 30 are adapted to bridge over any of the anchor or positioning clips used in combination with the trim and decorative member 5b for positioning purposes. By use of the channels 20 and 30 as disclosed in Figs. 6 and 7, it is possible for the trim and decorative members to have a neat, snug and secure engagement with the tire and wheel assembly, while use of such channels and ribs as referred to also facilitate the temporary engagement of the trim and decorative members with the rim of a wheel prior to securing an anchor ring thereto for permanent engaging action.

Fig. 8 shows a modified type of trim and decorative member 5c which has a groove 35 provided in the axially outer surface of the decorative portion of this trim member and with a rib 36 also being provided on the outer surface of the trim and decorative member so that the radially outer edge of an anchor ring can engage between such concentric groove and rib to aid in securing a trim member to a tire and wheel assembly. This trim and decorative member may have radially extending slots 37 provided therein which are adapted to bridge over or receive any anchor clips with which such trim and decorative member is engaged so as to facilitate a smooth connection between the trim and decorative member and the components used for securing it to a tire and wheel assembly.

Fig. 9 shows a trim and decorative member similar to that of Fig. 8, only with the member being indicated by numeral 5d. In this instance, such trim member 5d has a pair of concentric, closely adjacent but spaced ribs 40 provided thereon and with such ribs being provided at the portion of the trim and decorative member forming a connection between the decorative and skirt portions thereof. As yet another feature of this trim member 5d, an internal rib 41 is provided thereon, usually at the radially inner edge of the decorative portion of such trim member and this, as explained hereinbefore, tends to seat on the edge of the rim flange and reenforce the trim member where it has a stressed zone provided therein. The trim and decorative members 5c and 5d, in Figs. 8 and 9, would be held in position by the anchor ring used in the assembly of the trim and decorative members onto a tire and wheel assembly.

A trim and decorative member 5e is shown in Fig. 10 of the drawings and a particular feature of this member is that it has a pair of annular, radially spaced grooves 45 and 46 provided therein, which grooves converge in towards each other in the skirt portion of this trim member. A novel feature of this modification of the invention is that an anchor ring 8e, which preferably is made from a suitable plastic material such as polyethylene or equivalent substance, is provided and it has two converging axially inwardly extending ribs 47 and 48 provided thereon. Thus the ribs 47 and 48 are adapted to be engaged in or received in the grooves 45 and 46 and secure the anchor ring 8e firmly to such trim member 5e. The radially inner portion of the ring 8e will engage with the radially inner ends of the anchor clips 6e provided for this embodiment of the invention to facilitate permanent engagement of the ring and trim member to the tire assembly.

Figs. 11 and 12 show a further modification of the trim member of the invention wherein a trim member 5f has a relatively large anchor rib 50 provided thereon. The anchor rib 50 is engaged by a rather sharply axially inwardly directed outer edge 100 of an anchor ring 8f provided in this embodiment of the invention. It should be noted that the trim member 5f is initially molded to a shape as to engage snugly with the rim edge flange, as indicated in Fig. 12, at portions of the trim member spaced from engagement with the clips 5f used for securing the assembly to a tire and rim structure.

Fig. 13 of the drawings clearly shows a conventional pneumatic tire 60 positioned upon a rim 61 having a rim flange 62 provided thereon. A slightly different style of an anchor clip 63 is shown with an overhanging flange 64 so that the clip 63 extends generally radially inwardly of the rim flange 62 on the axially outer surface thereof. As a feature of this type of a clip 63, it is provided with a radially inwardly open anchor flap 65, usually formed integrally with the clip 63 by punching or striking, or otherwise forcing a portion of such clip to protrude therefrom. Such securing flap 65 preferably has an anchor rib or bead 66 extending transversely thereof. These clips 63 are made from any suitable material, and usually are made from metal with suitable composition to provide slight resiliency in the clip.

A trim and decorative member 67 of the same general type as disclosed hereinbefore is provided for engagement with this tire 60 and rim 61 as assembled. In this instance, a skirt portion 68 of the trim and decorative member may extend substantially along the same axis as the decorative portion of the member and be of generally uniform thickness throughout. However, other styles of trim members may be used, as desired. As a feature of this trim member, anchor members, for example, wires 69 are provided and are embedded in the skirt 68 at circumferentially spaced portions thereof, but with an engaging section, in this instance a U-shape center portion 70 of the wire 69 protruding from the axially inner surface of the skirt 68. This center portion 70 is adapted to be engaged with the securing flap 65 as the trim and decorative member 67 is positioned by being moved radially outwardly of the tire. Preferably the center wire portion 70 is moved radially outwardly until it seats on the bead 66 and this will at least temporarily engage the trim and decorative member 67 to the tire and rim assembly. However, a generally C-shaped anchor ring 71 of the general construction described herein, can be brought into engagement with the trim and decorative member 67 and the clips 63 to engage therewith as in the other structures of the invention and hold the trim and decorative member securely in engagement with the tire for protecting and decorating the sidewall portion thereof.

The sharply inturned edge on anchor rings, as in Fig. 11, may be used on all anchor rings to facilitate engagement with retaining ribs provided on the trim members.

The trim members of the invention are resilient and are molded to proper shape to facilitate their engagement with the lateral margins of a tire and rim assembly to maintain tight resilient engagement therewith when operatively positioned. The operative position of the skirt 68 of the trim 67 is indicated in dotted lines in Fig. 13 in the portion of the trim member engaging the clip 63.

It will be realized that any suitable number of clips, such as six, can be used to position the trim members of the invention.

Another feature which may be added to the trim members of the invention is that of a radially inner rib for engaging the overhanging edge of the rim flanges 4 and 62, for example. Thus a bead or rib 42 is provided on the trim member 5d. Such rib 42 is annular and concentric with the rib 41 which engages the radially outer surface of a rim flange while the rib 42 would engage the radially inner surface thereof. This trim member 5d may, or may not, as desired, have clip receiving slots in the skirt portion thereof.

The lugs 14 may be omitted from the trim member 5 in some instances.

Fig. 15 shows yet another type of an anchor ring 80, which may be made from a plastic material similar to the ring 8e, and is of the same general C-shaped as the other anchor rings of the invention. The ring 80 can be used to secure a trim member to anchor clips and position a trim member on a tire assembly. In this instance, a plurality of concentric, re-enforcing ribs 81 are provided on the axially inner surface of the ring for re-enforcing it, while the ring also may have pairs of parallel, circumferentially spaced baffles or retaining walls 82 provided thereon. These ribs or baffles 82 are provided to engage with the margins of the anchor clips used in association with this ring 80 and will prevent any circumferential movement of the ring with relation to the clips. As a further feature, the baffles 82 are provided with an edge contour or shape, indicated at 83, which is complementary to the general axially outer contour of a rim edge flange so that the rim, tire, trim member and positioning means will form a compact assembly which smoothly blends in with the contour of the rim and wheel assembly. The trim member used in association with such ring 80 could be of the general contour as shown, for instance, in Fig. 13, or it might be more of the molded shape shown in Figs. 11 and 12 wherein the trim member skirt portion is adapted to engage snugly with the rim edge flange.

From the foregoing it will be seen that the invention provides novel, effective types of pneumatic trim members and associated parts so that the objects of the invention are achieved.

While several complete embodiments of the invention have been disclosed herein, it will be appreciated that modification of these particular embodiments of the invention may be resorted to without departing from the scope of the invention as defined in the appended claims.

What is claimed is:

1. Trim and protective apparatus for use with a pneumatic tire and rim assembly and comprising a plurality of metal clips each of which has an overhanging flange extending from one end thereof adapted for engaging a tire rim flange and extending radially inwardly on the outer surface thereof, said metal clips being no longer than the radial length of a tire rim flange and being held tightly thereagainst when operatively positioned, a resilient flexible trim member having a decorative portion for lying against a tire sidewall and a radially inner skirt portion for contacting said clips when positioned on a tire rim, inter-engaging means provided on said clips and trim member to secure said trim member at least temporarily to a tire rim, and an anchor ring of C-shape in section for engaging said clips and aiding in securing said trim member to a tire rim.

2. Trim and protective apparatus for use with a pneumatic tire and rim assembly and comprising a plurality of metal clips for engaging a tire rim flange and extending radially inwardly on the outer surface thereof, a resilient flexible trim member having a decorative portion for lying against a tire sidewall and a radially inner skirt portion having a pair of annual recesses in the axially outer surface thereof, and an anchor ring with a radially inner end for engaging said clips and aiding in securing said trim member to a tire rim, said anchor ring having a pair of ribs thereon engaging said recesses in said skirt portion of said trim member.

3. Trim and protective apparatus for use with a pneumatic tire and rim assembly and comprising a plurality of clips each of which has an overhanging flange extending from one end thereof adapted for engaging a tire rim flange and extending radially inwardly on the outer surface thereof, said clips having radially inwardly open securing flaps provided thereon, a resilient flexible trim member having a decorative portion for lying against a tire sidewall and a radially inner skirt portion for contacting said clips when positioned on a tire rim, and anchor wires embedded in said skirt portions of said trim members and having sections extending from the axially inner surface thereof to engage said securing flaps when said clips are operatively positioned to secure said trim member to a tire rim.

4. Trim and protective apparatus for use with a pneumatic tire and rim assembly and comprising a plurality of metal clips each of which has an overhanging flange extending from one end thereof adapted for engaging a tire rim flange and extending radially inwardly on the outer surface thereof, said clips having radially inwardly open securing flaps provided on their axially outer surfaces, a resilient flexible trim member having a decorative portion for lying against a tire sidewall and a radially inner skirt portion for contacting said clips when positioned on a tire rim, and anchor wires having U-shaped sections on the axially inner surface of said skirt extending from said trim member to engage said securing flaps when said clips are operatively positioned to secure said trim member to a tire rim.

5. Trim and protective apparatus for use with a pneumatic tire and rim assembly and comprising a plurality of clips each of which has an overhanging flange extending from one end thereof adapted for engaging a tire rim flange to position the clip to extend radially inwardly of a rim on the outer surface thereof, said clips having radially inwardly open securing flaps provided on their axially outer surfaces, said flaps each having an anchor rib thereon extending transversely thereof, a resilient flexible trim member having a decorative portion for lying against a tire sidewall and a radially inner skirt portion for contacting said clips when positioned on a tire rim, and anchor wires embedded in said skirt portion and having U-shaped sections extending from the axially inner surface of said skirt to engage said securing flaps and the anchor ribs thereof when said clips are operatively positioned to secure said trim member to a tire rim.

6. Trim and protective apparatus for use with a pneumatic tire and rim assembly and comprising a plurality of metal clips each of which has an overhanging flange extending from one end thereof adapted for engaging a tire rim flange and extending radially inwardly on the outer surface thereof, a resilient flexible trim member having a decorative portion for lying against a tire sidewall and a radially inner skirt portion for contacting said clips when positioned on a tire rim, said trim member having a pair of concentric annular ribs on the axially outer surface thereof adjacent the connection of said decorative and trim portions, and a generally elongated C-shape in section anchor ring for securing said trim member to said clips and a tire rim when said clips are operatively positioned, said skirt portion terminating radially outwardly of the radially inner ends of said clips, the radially inner edge of said anchor ring engaging the radially inner ends of said clips and the radially outer edge of said anchor ring extending substantially axially inwardly and engaging said trim member intermediate said concentric ribs which are operatively positioned radially outwardly of a tire rim flange.

7. Apparatus as in claim 1 wherein said trim member has a skirt portion extending axially inwardly at substantially a 90° angle to said trim portion to catch under a tire rim edge flange, and a plurality of tabs are provided in said skirt portion separated from the remainder of said skirt portion by radially extending slits whereby portions of said skirt portion can be pulled out to lie over said clips and remaining parts of said skirt can catch in under a rim flange edge.

8. Apparatus for use in securing trim members to pneumatic tire and rim assemblies and comprising a ring of generally elongated C-shape in section, said ring having concentric reenforcing ribs on its axially inner surface, said ring also having pairs of baffles thereon on its axially inner surface at circumferentially spaced portions thereof, said baffles being axially directed and being generally complemental in shape to the contour of the axially outer edge of a rim edge flange.

9. Apparatus for use in securing trim members to pneumatic tire and rim assemblies and comprising a resilient plastic ring of generally elongated C-shaped in section, said ring having concentric reenforcing ribs on its axially inner surface, said ring also having pairs of baffles thereon on its axially inner surface at circumferentially spaced portions thereof, said baffles being normal to the adjacent axially inner surface portions of said ring.

10. Apparatus for use in securing trim members to pneumatic tire and rim assemblies and comprising clip means for engaging a tire rim flange, and a resilient plastic ring of generally elongated C-shape in section, said ring also having pairs of baffles thereon on its axially inner surface at circumferentially spaced portions thereof, said baffles being axially directed and being adapted to engage the lateral margins of said clip means and prevent arcuate movement of said ring.

11. Apparatus for use in protecting pneumatic tire and rim assemblies and comprising a trim member for engaging lateral portions of a tire rim flange and a tire sidewall and having an annular recess in the axially outer surface of a radially inner portion thereof which overlies a tire rim flange when the trim member is operatively positioned, clips for engaging a tire rim flange, and a ring of generally elongated C-shape in section, said ring having at least one reenforcing rib on its axially inner surface for engaging said recess in said trim member and aiding in securing said ring thereto, said ring having a radially inner edge for engaging said clips, when secured to a tire rim flange, for securing said ring and trim member operatively to such rim flange.

12. Trim and protective apparatus for use with a pneumatic tire and rim assembly and comprising a plurality of clips each of which has an overhanging flange extending from one end thereof adapted for engaging a tire rim flange and extending radially inwardly on the outer surface thereof, said metal clips being no longer than the radial length of a tire rim flange and being held tightly thereagainst when operatively positioned, a resilient flexible trim member having a decorative portion for lying against a tire sidewall and a radially inner skirt portion for contacting said clips when positioned on a tire rim, said trim member having radially directed channel means molded integrally therewith at circumferentially spaced portions on said skirt portion thereof to secure said trim member at least temporarily to said clips when on a tire rim, and an anchor ring of C-shaped in section for engaging said clips and aiding in securing said trim member to a tire rim.

13. Trim and protective apparatus for use with a pneumatic tire and flanged rim assembly and comprising a plurality of clips each of which has an overhanging flange extending from one end thereof adapted for engaging a tire rim flange and extending radially inwardly on the outer surface thereof, and a resilient flexible trim member having a decorative portion for lying against a tire sidewall and a radially inner skirt portion for contacting said clips and rim flange when positioned on a tire rim, said trim member having radially directed channel means open at their radially inner ends molded integrally therewith at circumferentially spaced portions on said skirt portion thereof with opposed lips extending inwardly thereof for engaging said clips to secure said trim member at least temporarily to said clips when the clips are engaged with a tire rim.

14. Trim and protective apparatus for use with a pneumatic tire and rim assembly and comprising a plurality of clips each of which has an overhanging flange extending from one end thereof adapted for engaging a tire rim flange and extending radially inwardly on the outer surface thereof, a resilient flexible trim member having a decorative portion for lying against a tire sidewall and a radially inner skirt portion for contacting said clips when positioned on a tire rim, said trim member having an axially outwardly protruding rib adjacent the connection of the skirt and decorative portions thereof, and an anchor ring of C-shaped in section for engaging said clips and aiding in securing said trim member to a tire rim, said anchor ring having a radially outer edge turned inwardly at approximately a 90° angle to the remainder of the ring and which engages the radially outer edge of said rib on said trim member to aid in the positioning thereof, said anchor ring outer eldge being operatively positioned radially outwardly of a tire rim flange.

15. Apparatus as in claim 12 wherein said channel means each have pairs of opposed, spaced lug means at the radially inner ends thereof and on the axially inner surface thereof for engaging axially inner portions of said clips to aid in engaging said trim member to said clips.

References Cited in the file of this patent

UNITED STATES PATENTS

| | | |
|---|---|---|
| 1,968,076 | Goodyear et al. | July 31, 1934 |
| 2,542,181 | Core | Feb. 20, 1951 |
| 2,696,409 | Barnes | Dec. 7, 1954 |
| 2,749,184 | Wood | June 5, 1956 |

FOREIGN PATENTS

| | | |
|---|---|---|
| 1,061,278 | France | Nov. 25, 1953 |